(12) United States Patent
Decuzzi

(10) Patent No.: US 11,766,929 B1
(45) Date of Patent: Sep. 26, 2023

(54) DRIVE SYSTEM FOR ALL-TERRAIN VEHICLE (ATV)

(71) Applicant: Louis Decuzzi, Brunswick, OH (US)

(72) Inventor: Louis Decuzzi, Brunswick, OH (US)

(73) Assignee: Louis DeCuzzi, Brunswick, OH (US)

( * ) Notice: Subject to any disclaimer, the term of this patent is extended or adjusted under 35 U.S.C. 154(b) by 365 days.

(21) Appl. No.: 17/084,760

(22) Filed: Oct. 30, 2020

Related U.S. Application Data

(60) Provisional application No. 62/927,987, filed on Oct. 30, 2019.

(51) Int. Cl.
| | |
|---|---|
| B60K 7/00 | (2006.01) |
| B60K 1/04 | (2019.01) |
| B60L 15/20 | (2006.01) |
| B60K 17/12 | (2006.01) |
| B60K 17/22 | (2006.01) |
| B60L 53/22 | (2019.01) |
| B60Q 1/04 | (2006.01) |
| B62D 21/18 | (2006.01) |
| B60K 17/04 | (2006.01) |
| B60Q 5/00 | (2006.01) |
| B60Q 1/30 | (2006.01) |
| B60Q 1/44 | (2006.01) |
| B60Q 1/34 | (2006.01) |
| B60Q 1/20 | (2006.01) |
| B60L 50/60 | (2019.01) |
| H02K 7/00 | (2006.01) |
| H02K 7/116 | (2006.01) |
| H02K 11/00 | (2016.01) |

(Continued)

(52) U.S. Cl.
CPC .............. *B60K 7/0007* (2013.01); *B60K 1/04* (2013.01); *B60K 17/043* (2013.01); *B60K 17/12* (2013.01); *B60K 17/22* (2013.01); *B60L 15/20* (2013.01); *B60L 50/66* (2019.02); *B60L 53/22* (2019.02); *B60Q 1/04* (2013.01); *B60Q 1/20* (2013.01); *B60Q 1/30* (2013.01); *B60Q 1/34* (2013.01); *B60Q 1/44* (2013.01); *B60Q 5/00* (2013.01); *B62D 21/183* (2013.01); *B62D 61/065* (2013.01); *H02K 7/006* (2013.01); *H02K 7/116* (2013.01); *H02K 11/0094* (2013.01); *B60K 2001/0405* (2013.01); *B60K 2007/0038* (2013.01); *B60L 2210/12* (2013.01); *B66D 1/12* (2013.01)

(58) Field of Classification Search
CPC ........ B60K 7/0007; B60K 1/04; B60K 17/12; B60K 17/22; B60K 2001/0405; B60K 2001/0477; B60L 15/20
See application file for complete search history.

(56) References Cited

U.S. PATENT DOCUMENTS

| | | | | |
|---|---|---|---|---|
| 5,585,205 | A * | 12/1996 | Kohchi ............... | H01M 50/249 180/68.5 |
| 5,760,569 | A * | 6/1998 | Chase, Jr. ........... | H01M 50/249 414/281 |

(Continued)

*Primary Examiner* — Frank B Vanaman
(74) *Attorney, Agent, or Firm* — Edwin A. Sisson, Attorney at Law, LLC; Jeffrey J. Banyas

(57) ABSTRACT

A drive system for an all-terrain vehicle (ATV) comprises an electric motor, at least three wheel and tire assemblies, a primary battery, a control module and a throttle device. The primary battery may be located within at least two opposing frame rails of a chassis of the all-terrain vehicle.

18 Claims, 5 Drawing Sheets

(51) Int. Cl.
*B62D 61/06* (2006.01)
*B66D 1/12* (2006.01)

(56) References Cited

U.S. PATENT DOCUMENTS

| | | | | |
|---|---|---|---|---|
| 6,406,812 | B1* | 6/2002 | Dreulle | H01M 50/209 |
| | | | | 429/96 |
| 6,702,057 | B1* | 3/2004 | Bartel | B60G 11/04 |
| | | | | 180/292 |
| 7,819,220 | B2* | 10/2010 | Sunsdahl | B60K 17/348 |
| | | | | 180/312 |
| 8,640,814 | B2* | 2/2014 | Deckard | B60N 2/38 |
| | | | | 296/205 |
| 2006/0108956 | A1* | 5/2006 | Clark | B60W 10/18 |
| | | | | 318/432 |
| 2010/0314182 | A1* | 12/2010 | Crain | B60L 50/66 |
| | | | | 320/109 |
| 2011/0297470 | A1* | 12/2011 | Heichal | H01M 50/204 |
| | | | | 180/68.5 |
| 2012/0171552 | A1* | 7/2012 | Lachenmeier | B60L 58/19 |
| | | | | 429/159 |
| 2014/0144719 | A1* | 5/2014 | Morgan | B60T 1/062 |
| | | | | 180/65.31 |
| 2017/0106733 | A1* | 4/2017 | Tsuji | B60R 5/04 |
| 2017/0334279 | A1* | 11/2017 | Higuchi | B60L 50/66 |
| 2018/0130983 | A1* | 5/2018 | Tessier | H01M 50/202 |

* cited by examiner

DRIVE SYSTEM FOR ALL-TERRAIN VEHICLE (ATV)

CROSS REFERENCES AND PRIORITIES

This Application claims priority from U.S. Provisional Application No. 62/927,987 filed on 30 Oct. 2019, the teachings of which are incorporated by reference herein in their entirety.

BACKGROUND

All-terrain vehicles, also known as ATVs, are used for a variety of purposes including personal recreation, safety patrols, search and rescue operations, and racing. ATVs come in many configurations including three wheel and four wheel variations. The typical ATV has a space frame chassis with an internal combustion engine mounted within the space frame to provide rotational force to the ATV's drive train which in turn rotates at least one of the ATV's wheel and tire assemblies.

Recently, efforts have been made to replace the internal combustion engines in many types of vehicles—such as cars and trucks—with an electric motor. These efforts have also been directed to ATVs.

One challenge faced when replacing internal combustion engines with electric motors centers around the use of batteries. Electric motors used in portable vehicles cannot be hard wired to an electrical grid due to the mobile nature of the vehicle. Accordingly, the vehicle must include a battery for providing electricity to the electric motor. Electric vehicle batteries must be of a relatively high voltage to provide sufficient electricity to the electric motor to allow the vehicle to travel a reasonable distance without having to recharge or replace the battery. This often results in batteries for electric vehicles having a large volume and weight, which is often incongruous with relatively small vehicles such as ATVs.

Early efforts to convert ATVs from internal combustion engines to electric motors have addressed this problem by mounting the battery outside of the space frame chassis. The typical mounting location is high above the rear axle. Given the relatively high weight of the battery, this can have significant negative ramifications for the ATVs handling characteristics and safety. The battery weight mounted at this location can give the ATV an unwanted high center of gravity, and provide a poor front to rear weight balance.

The need exists—therefore—for an improved drive system for an ATV which makes use of an electric motor powered by a battery.

SUMMARY

Disclosed herein is a drive system for an all-terrain vehicle (ATV). The drive system comprises an electric motor, at least three wheel and tire assemblies, a primary battery, a control module, and a throttle device. The primary battery is located within at least two opposing frame rails of a chassis of the all-terrain vehicle (ATV).

The electric motor may be a three-phase electric motor. The electric motor may be rotationally connected to at least one of the wheel and tire assemblies. The electric motor may be electrically connected to, and configured to receive at least a first signal from the control module. The control module may be electrically connected to, and configured to receive a charge from the primary battery. The throttle device may be electrically connected to, and configured to send a second signal to the control module.

In some embodiments, the electric motor may be rotationally connected to at least two of the wheel and tire assemblies. In certain embodiments, the drive system may comprise four wheel and tire assemblies. The electric motor may be rotationally connected to each of the four wheel and tire assemblies. In certain embodiments, the electric motor may be rotationally connected to the wheel and tire assemblies by an electric motor gearbox which is rotationally connected to a driveshaft which is rotationally connected to a gearbox which is rotationally connected to an axle.

In some embodiments, the drive system may further comprise at least one device selected from the group consisting of a light, a horn, and a winch. The drive system may also further comprise a step down converter, a secondary battery, and a transducer. The step down converter, when present, may be electrically connected to, and configured to receive a charge for the second battery at a first voltage level. Each device of the at least one device may be electrically connected to, and configured to receive a signal from the step down converter at a second voltage level which is less than the first voltage level when a circuit between the device and the secondary battery is opened. The transducer may be electrically connected to the primary battery and the secondary battery to provide a recharging voltage to the secondary battery from the primary battery.

The at least one device, in certain embodiments, may comprise at least one light. The at least one light may be selected from the group consisting of at least one headlight, at least one tail light, at least one brake light, at least one turn signal light, at least one daytime running light, and at least one fog light.

In certain embodiments, the primary battery may be contained within a housing. The housing, when present, may have a first cuboid shape. In some such embodiments, the housing may include an extension protruding upward from a top surface of the first cuboid shape. The extension itself may have a second cuboid shape.

In some embodiments, the chassis may comprise a slideable drawer configured to receive the primary battery. In certain such embodiments, the slideable drawer may comprise a pair of opposing tracks. In some such embodiments, at least one of the pair of opposing tracks may comprise a friction reducing mechanism. The friction reducing mechanism may be at least one bearing. In some embodiments, the friction reducing mechanism may be at least one slide plate. The at least one slide plate, when present, may comprise a material selected from the group consisting of ultra high molecular weight polyethylene (UHMW) plastics, bronze, powdered metal, and Teflon®.

In certain embodiments the electric motor may be rotationally connected to the wheel and tire assemblies by a gear and chain drive connected to an axle. In other embodiments, the electric motor may be rotationally connected to the wheel and tire assemblies by a belt and pulley drive connected to an axle.

In some embodiments the primary battery may be a lithium battery. In other embodiments the primary battery may be a lead acid battery.

DETAILED DESCRIPTION

Disclosed herein is a drive system for an all-terrain vehicle. The drive system is described below with reference to the Figures. As described herein and in the claims, the following numbers refer to the following structures as noted in the Figures.

10 refers to a drive system.
20 refers to an all-terrain vehicle.
30 refers to a chassis.
35 refers to a slideable drawer.
37 refers to a track.
100 refers to an electric motor.
110 refers to an electric motor gearbox.
200 refers to a wheel and tire assembly.
210 refers to a gearbox.
220 refers to an axle.
230 refers to a driveshaft.
300 refers to a primary battery.
310 refers to a stepdown converter.
350 refers to a secondary battery.
355 refers to a transducer.
400 refers to a control module.
500 refers to a throttle device.
600 refers to a light.
610 refers to a horn.
620 refers to a winch.

Figure 1:
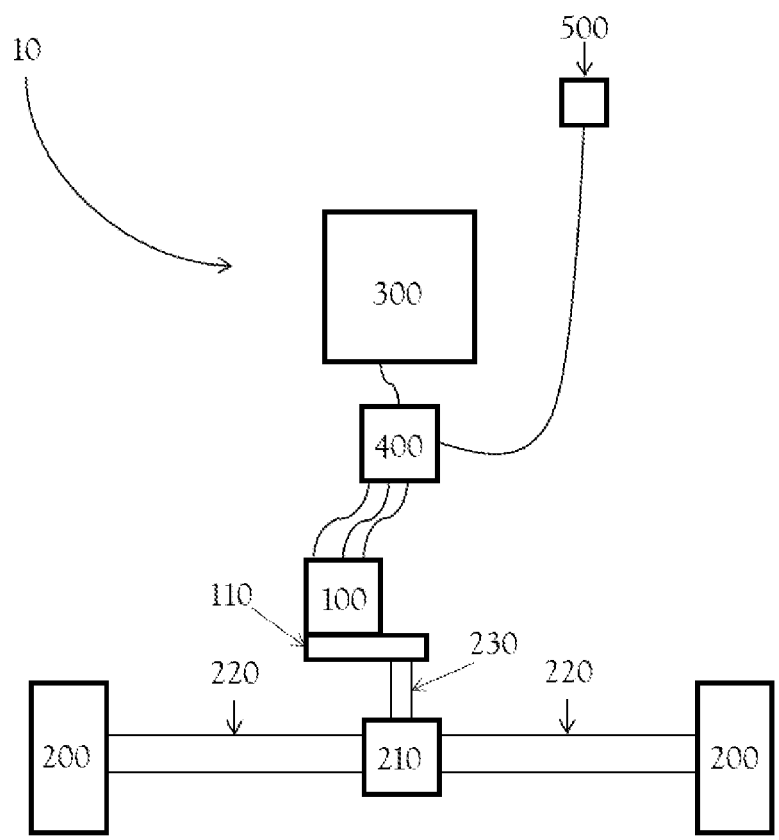
FIG. 1 is a block diagram of an embodiment of a drive system for an all-terrain vehicle (ATV).
Figure 4:
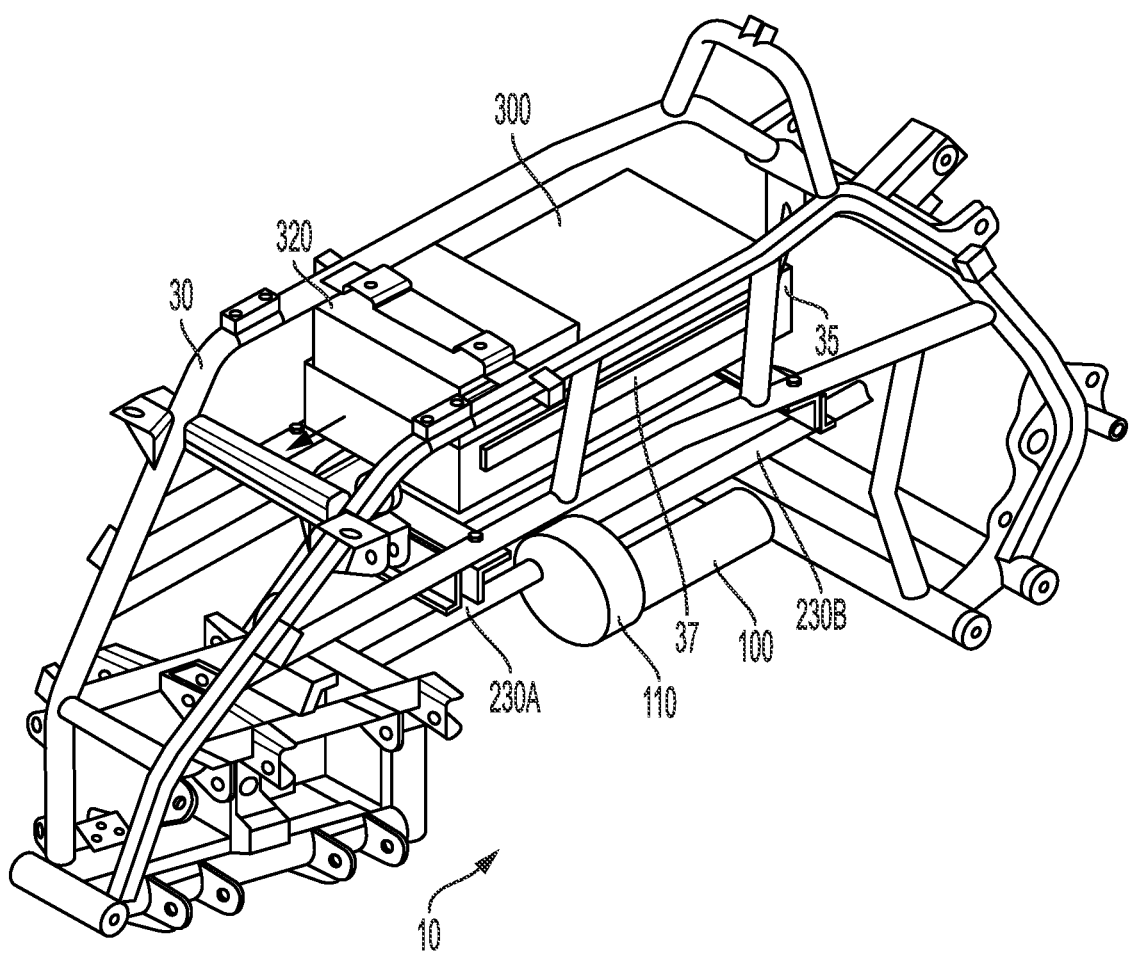
FIG. 4 is a perspective view of a chassis of an all-terrain vehicle with a battery installed therein.

FIG. 1 depicts a block diagram of one embodiment of a drive system (10) for an all-terrain vehicle (ATV) (20 as shown in FIG. 4). As depicted in FIG. 1, the drive system may comprise an electric motor, at least three wheel and tire assemblies (200) (only two of which are shown in FIG. 1), a primary battery (300), a control module (400), and a throttle device (500). While FIG. 1 shows only two wheel and tire assemblies—many configurations of wheel and tire assemblies are possible, non-limiting examples of which are described below.

FIG. 1 also depicts the connections between the various components. As shown in FIG. 1, the electric motor (100) may be rotationally connected to at least one of the wheel and tire assemblies (200). The rotational connection may come in a variety of configurations.

In some embodiments, the ATV may be a three wheeled ATV with two wheel and tire assemblies in the front and a single wheel and tire assembly in the back. In such embodiments, the electric motor may be rotationally connected to the single wheel and tire assembly in the back by a gear and chain drive connected to an axle or by a belt and pulley drive connected to an axle.

In other embodiments, the ATV may be a three wheeled ATV with one wheel and tire assembly in the front and two wheel and tire assemblies in the back. In such embodiments, the electric motor may be rotationally connected to the two wheel and tire assemblies in the back by any number of mechanisms. One preferred mechanism—as shown in FIG. 1—is an electric motor gearbox (110) which is rotationally connected to a driveshaft (230) which is rotationally connected to a gearbox (210) which is rotationally connected to an axle (220). Examples of other mechanisms include a gear and chain drive connected to an axle, or a belt and pulley drive connected to an axle.

Four wheeled embodiments of ATVs are common with two wheel and tire assemblies in the front and two wheel and tire assemblies in the back. In such embodiments, the electric motor may be rotationally connected to the two wheel and tire assemblies in the back, the two wheel and tire assemblies in the front, or each of the four wheel and tire assemblies. Mechanisms for connecting the electric motor to the wheel and tire assemblies may include an electric motor gearbox which is rotationally connected to a driveshaft which is rotationally connected to a gearbox which is rotationally connected to an axle, a gear and chain drive connected to an axle, or a belt and pulley drive connected to an axle. In embodiments where the electric motor is rotationally connected to each of the four wheel and tire assemblies—there may be two mechanisms—one for connecting the electric motor to the two wheel and tire assemblies in the front and a second for connecting the electric motor to the two wheel and tire assemblies in the back, although the mechanism connecting the electric motor to the two wheel and tire assemblies in the front may share an electric motor gearbox with the mechanism connecting the electric motor to the two wheel and tire assemblies in the back.

FIG. 1 also shows the electric motor (100) electrically connected to, and configured to receive at least a first signal from the control module (400). The preferred electric motor is a three-phase electric motor. The electrical connection between the electric motor and the control module may comprise three separate electrical communication connections. Each electrical communication sends a signal in the form of amperage from the control module to the electric motor to activate one of the coils of the electric motor.

The control module (400) may be electrically connected to, and configured to receive a charge from the primary battery (300) as shown in FIG. 1. The charge from the primary battery will be in the form of voltage which is passed through the control module and transmitted to another device—such as the electric motor (100)—when the control module receives a signal to activate said other device—such as a signal from a throttle device (500).

FIG. 1 further depicts the throttle device (500) electrically connected to, and configured to send a second signal to the control module (400). The second signal indicates to the control module to pass voltage from the primary battery (300) to the electric motor (100) with the amount of voltage controlled by the amount of throttle input provided by the operator. Specific non-limiting examples of a throttle device include a pedal throttle, a thumb throttle, and a twist throttle—each of which are well known in the art.

The primary battery (300), is preferably a 72 volt 100 amp lithium battery. The lithium battery may be a lithium ion battery, a lithium polymer battery, or a lithium prismatic battery. While a lithium battery is preferred, other batteries are possible, including lead acid batteries.

The control module (400) draws amperage from the primary battery upon receiving a signal from the throttle device. The control module then passes said amperage to the electric motor. Preferably the amount of amperage transmitted to the electric motor is determined by the amount of user input into the throttle device. The preferred control module is a circuit board.

Figure 2:
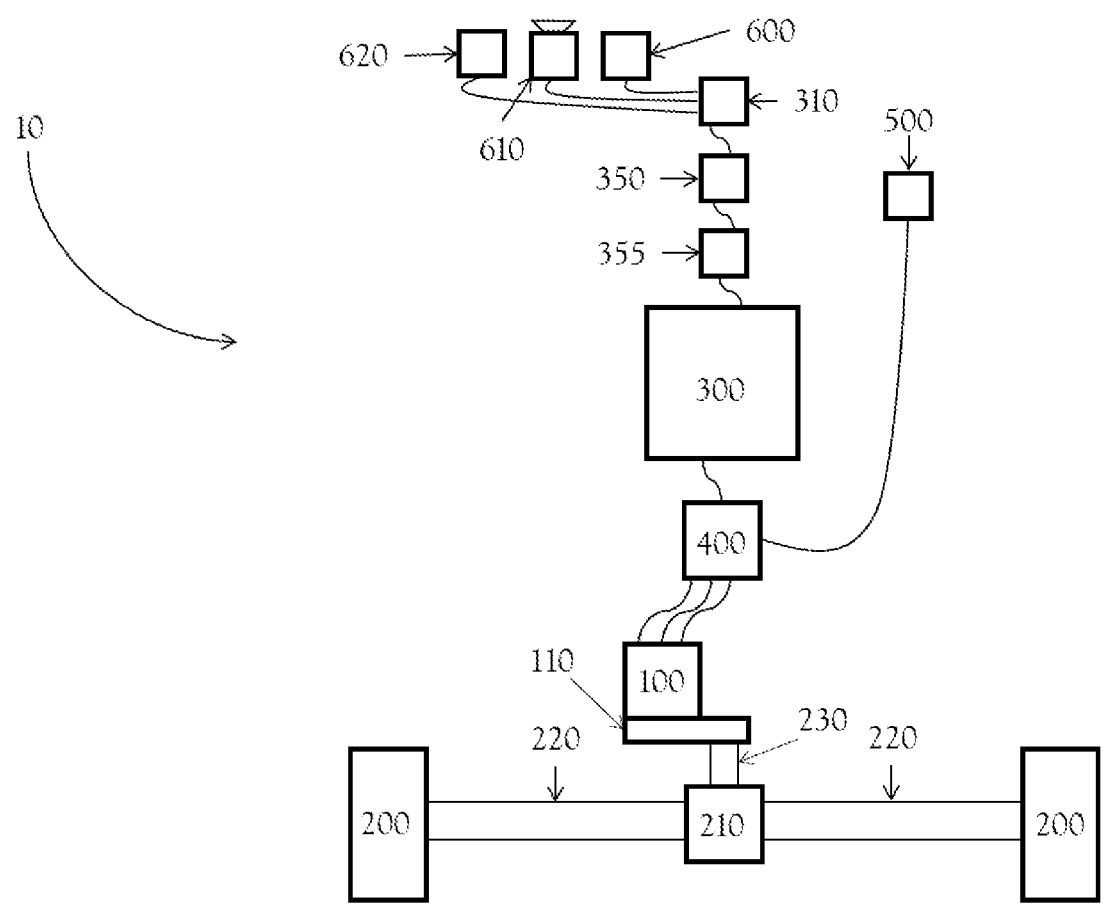
FIG. 2 is a block diagram of a separate embodiment of a drive system for an all-terrain vehicle (ATV).

FIG. 2 depicts an embodiment of the drive system (10) showing additional features of the all-terrain vehicle (ATV). As shown in FIG. 2, the drive system may further comprise at least one device selected from the group consisting of a light (600), a horn (61), and a winch (620). The drive system may also further comprise a step down converter (310), a secondary battery (350), and a transducer (355).

As shown in FIG. 2, the step down converter (310) may be electrically connected to, and configured to receive a charge from the secondary battery (350) at a first voltage level. The step down converter then reduces the charge before sending the charge at a second voltage level (which is less than the first voltage level) to each device of the at least one device. In this regard, it is noted that each device of the at least one device may be electrically connected to, and configured to receive a charge from the step down converter.

The transducer (355) may be electrically connected to the primary battery (300) and the secondary battery (350) as shown in FIG. 2. This allows the secondary battery to be recharged by the primary battery through the transducer. In other words, the transducer provides a recharging voltage to the secondary battery from the primary battery.

Each device of the at least one device may be electrically connected to, and configured to receive a signal from the secondary battery (350) through the step down converter (310). This signal may be in the form of voltage from the secondary battery when a circuit between the secondary battery is opened, such as by a switch or button.

When the at least one device includes a light (600), the light may be in a variety of locations and may serve a variety of well-known functions. Common lights include at least one headlight, at least one tail light, at least one brake light, at least one turn signal light, at least one daytime running light, and at least one fog light.

Figure 3:
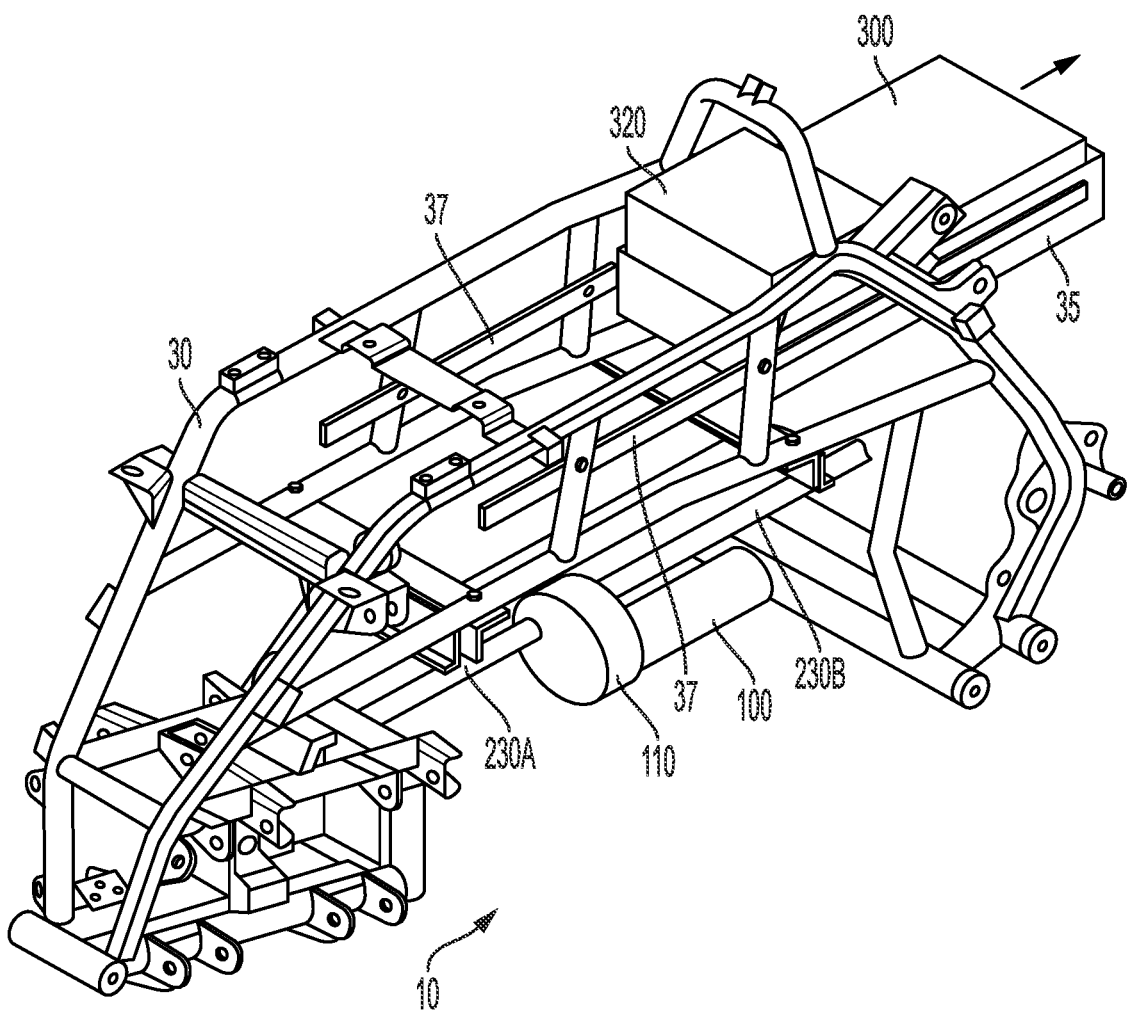
FIG. 3 is a perspective view of a chassis of an all-terrain vehicle with a battery in place for installation.

FIG. 3 depicts one embodiment of the primary battery (300) and chassis (30) of the all-terrain vehicle. As shown in FIG. 3, the primary battery may be contained within a housing (320). The housing may have a cuboid shape as shown in FIG. 3, although other shapes may be possible including a cube, a cylinder, a sphere, a spheroid, or any polyhedron having four or more faces.

In some embodiments, such as that shown in FIG. 3, the housing (320) may include at least one extension. When present, at least one of the extensions may protrude upward from a top surface of the cuboid shape of the housing. In certain embodiments, the extension itself may also have a cuboid shape, although other shapes may be possible including a cube, a cylinder, a sphere, a spheroid, or any polyhedron having four or more faces.

FIG. 3 also shows a removal system for the primary battery (300). The removal system may comprise a slideable drawer (35) configured to receive the primary battery. The slideable drawer may be connected to the chassis (30) within at least two opposing frame rails of the chassis. As shown in FIG. 3, the slideable drawer may comprise a pair of opposing tracks (37) similar to those used in toolbox or kitchen drawers.

In some embodiments, the pair of opposing tracks (37) may comprise a friction reducing mechanism. One example of a friction reducing mechanism is a bearing, which may be a ball bearing, or a roller bearing. Another example of a friction reducing mechanism is a slide plate. Slide plates may be comprised of a material selected from the group consisting of ultra high molecular weight polyethylene (UHMW) plastics, bronze, powdered metal, and Teflon®.

As shown in FIG. 3, the slideable drawer (35) has been extended at least partially out the rear of the all-terrain vehicle's chassis. While FIG. 3 shows the slideable drawer extending out the rear of the all-terrain vehicle's chassis, other configurations may exist in which the slideable drawer is configured to extend out the front of the all-terrain vehicle's chassis, or out of either side of the all-terrain vehicle's chassis. Once the slideable drawer has been extended, the primary battery (300) can be easily unplugged from the all-terrain vehicle's electrical system and removed from all-terrain vehicle for repair, replacement, or storage during times of non-use of the all-terrain vehicle.

FIG. 3 also shows the electric motor (100) located within at least two opposing frame rails of the chassis. The embodiment of the electric motor shown in FIG. 3 is configured for a four-wheel drive all-terrain vehicle in which the electric motor is rotationally connected to the two wheel and tire assemblies in the back of the all-terrain vehicle as well as the two wheel and tire assemblies in the front of the all-terrain vehicle. In the embodiment shown in FIG. 3, the electric motor is rotationally connected to the wheel and tire assemblies by an electric motor gearbox (110) which is rotationally connected to a pair of driveshafts (230A/230B) with the front driveshaft configured to be rotationally connected to a first gearbox which is rotationally connected to an axle which turns the wheel and tire assemblies in the front of the all-terrain vehicle, and the rear driveshaft configured to be rotationally connected to a second gearbox which is rotationally connected to an axle which turns the wheel and tire assemblies in the back of the all-terrain vehicle.

FIG. 4 depicts a perspective view of a chassis (30) of an all-terrain vehicle (ATV). As shown in FIG. 3, the primary battery (300) may be located within at least two opposing frame rails of the chassis. In the embodiment shown in FIG. 3, the primary battery is located within a housing which is configured to fit within the slideable drawer (35). Unlike in FIG. 3 where the slideable drawer is shown extended to allow the battery to be removed, in FIG. 4 the slideable drawer is retracted showing the battery in place where it resides during operation of the ATV. In some embodiments, once the slideable drawer is retracted, one or more latches or lock assemblies may hold the slideable drawer in place to prevent the slideable drawer from extending during operation.

As shown in FIG. 4, during operation the primary battery (300) may be located within at least two opposing frame rails of the chassis (30). While FIG. 4 shows the primary battery located within at least two opposing frame rails of the chassis in the approximate location of a fuel tank found in a traditional internal combustion engine powered ATV, other locations may be possible. For example, in some embodiments, the primary battery may be located in the approximate location of the engine found in a traditional internal combustion powered ATV.

Figure 5:
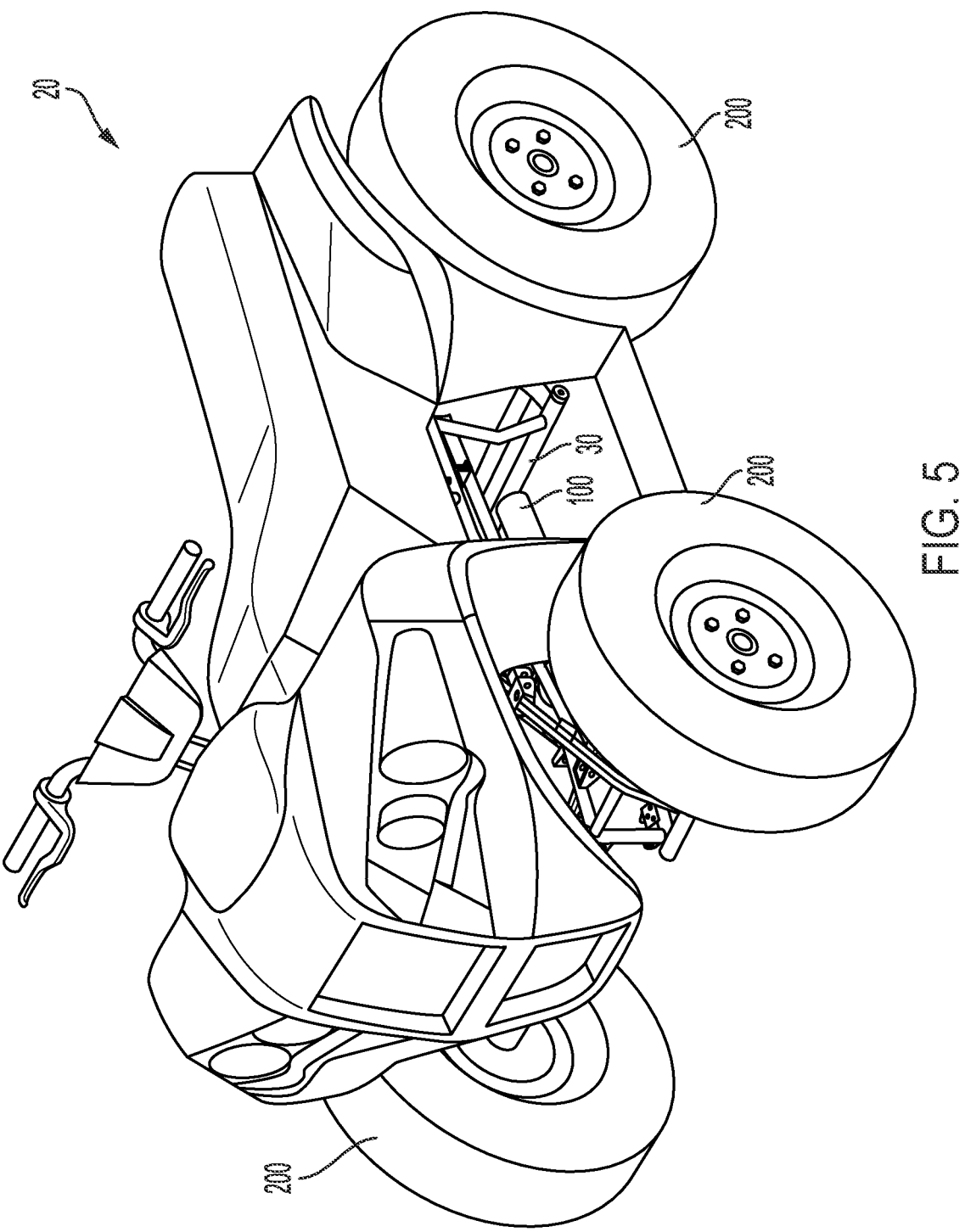
FIG. 5 is a perspective view of an all-terrain vehicle having a drive system as described herein.

FIG. 5 depicts a perspective view of an all-terrain vehicle (20) including the drive system (10) disclosed herein. As shown in FIG. 4, the primary battery (300) may be located within at least two opposing frame rails of the chassis. In this case—and in FIG. 3—the chassis is a space frame chassis as found in most ATVs. However, other embodiments may exist in which the chassis is a ladder frame chassis, a unibody chassis, a backbone tube chassis, an X-frame chassis, a perimeter frame chassis, a platform frame chassis, or a subframe chassis.

What is claimed is:
1. A drive system (10) for an all-terrain vehicle (ATV) (20) comprising:
   an electric motor (100);
   at least three wheel and tire assemblies (200);
   a primary battery (300) located within at least two opposing frame rails of a chassis (30) of the all-terrain vehicle (ATV), said chassis being a space frame chassis;

a control module (400);
a throttle device (500);
at least one device selected from the group consisting of a light (600), a horn (610), and a winch (620);
a step down converter (310);
a secondary battery (350); and
a transducer (355); and
wherein
the electric motor is a three-phase electric motor;
the electric motor is rotationally connected to at least one of the wheel and tire assemblies;
the electric motor is electrically connected to, and configured to receive at least a first signal from the control module;
the control module is electrically connected to, and configured to receive a charge from the primary battery; and
the throttle device is electrically connected to, and configured to send a second signal to the control module;
the step down converter is electrically connected to, and configured to receive a charge from the secondary battery at a first voltage level;
each device of the at least one device is electrically connected to, and configured to receive a signal from the step down converter at a second voltage level which is less than the first voltage level; and
the transducer is electrically connected to the primary battery and the secondary battery to provide a recharging voltage to the secondary battery from the primary battery.

2. The drive system of claim 1, wherein the at least one device comprises at least one light selected from the group consisting of at least one headlight, at least one tail light, at least one brake light, at least one turn signal light, at least one daytime running light, and at least one fog light.

3. The drive system of claim 1, wherein the primary battery is contained within a housing (320), said housing having a first cuboid shape.

4. The drive system of claim 3, wherein the housing includes an extension protruding upward from a top surface of the first cuboid shape wherein said extension has a second cuboid shape.

5. The drive system of claim 3, wherein the chassis comprises a slideable drawer (35) configured to receive the primary battery.

6. The drive system of claim 5, wherein the slideable drawer comprises a pair of opposing tracks (37).

7. The drive system of claim 6, wherein at least one of the pair of opposing tracks comprises a friction reducing mechanism.

8. The drive system of claim 7, wherein the friction reducing mechanism is at least one bearing.

9. The drive system of claim 7, wherein the friction reducing mechanism is at least one slide plate comprising a material selected from the group consisting of ultra high molecular weight polyethylene (UHMW) plastics, bronze, powdered metal, and polytetrafluoroethylene.

10. The drive system of claim 1, wherein the electric motor is rotationally connected to the wheel and tire assemblies by a gear and chain drive connected to an axle.

11. The drive system of claim 1, wherein the electric motor is rotationally connected to the wheel and tire assemblies by a belt and pulley drive connected to an axle.

12. The drive system of claim 1, wherein the primary battery is a lithium battery.

13. The drive system of claim 1, wherein the primary battery is a lead acid battery.

14. The drive system of claim 1, wherein the electric motor is rotationally connected to at least two of the wheel and tire assemblies.

15. The drive system of claim 1, comprising four wheel and tire assemblies.

16. The drive system of claim 15, wherein the electric motor is rotationally connected to each of the four wheel and tire assemblies.

17. The drive system of claim 16, wherein the electric motor is rotationally connected to the wheel and tire assemblies by an electric motor gearbox (110) which is rotationally connected to a driveshaft (230) which is rotationally connected to a gearbox (210) which is rotationally connected to an axle.

18. The drive system of claim 1, wherein the electric motor is rotationally connected to the wheel and tire assemblies by an electric motor gearbox (110) which is rotationally connected to a driveshaft (230) which is rotationally connected to a gearbox (210) which is rotationally connected to an axle (220).

* * * * *